United States Patent [19]

Speece

[11] 4,087,262
[45] May 2, 1978

[54] PRESSURIZED GAS TRANSFER SYSTEM WITH DILUTION CONTROL

[76] Inventor: Richard E. Speece, 2123 Reynolds St., Falls Church, Va. 22043

[21] Appl. No.: 691,762

[22] Filed: Jun. 1, 1976

[51] Int. Cl.² ............................................. B01D 19/00
[52] U.S. Cl. ........................................ 55/52; 210/60
[58] Field of Search ............. 55/52, 53, 196; 73/219; 137/1; 210/14, 15, 63 R, 194, 198 R, 205, 221 EO; 261/91, 93

[56] References Cited

U.S. PATENT DOCUMENTS

| | | | |
|---|---|---|---|
| 3,555,783 | 1/1971 | Grimshaw | 210/221 P X |
| 3,643,403 | 2/1972 | Speece | 55/53 |
| 3,804,255 | 4/1974 | Speece | 210/221 P X |
| 3,926,588 | 12/1975 | Speece | 55/52 |
| 3,968,035 | 7/1976 | Howe | 210/63 R X |

Primary Examiner—Charles N. Hart
Assistant Examiner—Richard W. Burks
Attorney, Agent, or Firm—Clarence A. O'Brien; Harvey B. Jacobson

[57] ABSTRACT

The concentration of gas in a liquid is diluted to prevent effervescence and loss of dissolved gas, by introducing a diluent to a liquid emerging from a plug flow chamber within which the liquid is supersaturated with gas by recirculation of the liquid through a closed loop including the plug flow chamber and a gas transfer device.

8 Claims, 1 Drawing Figure

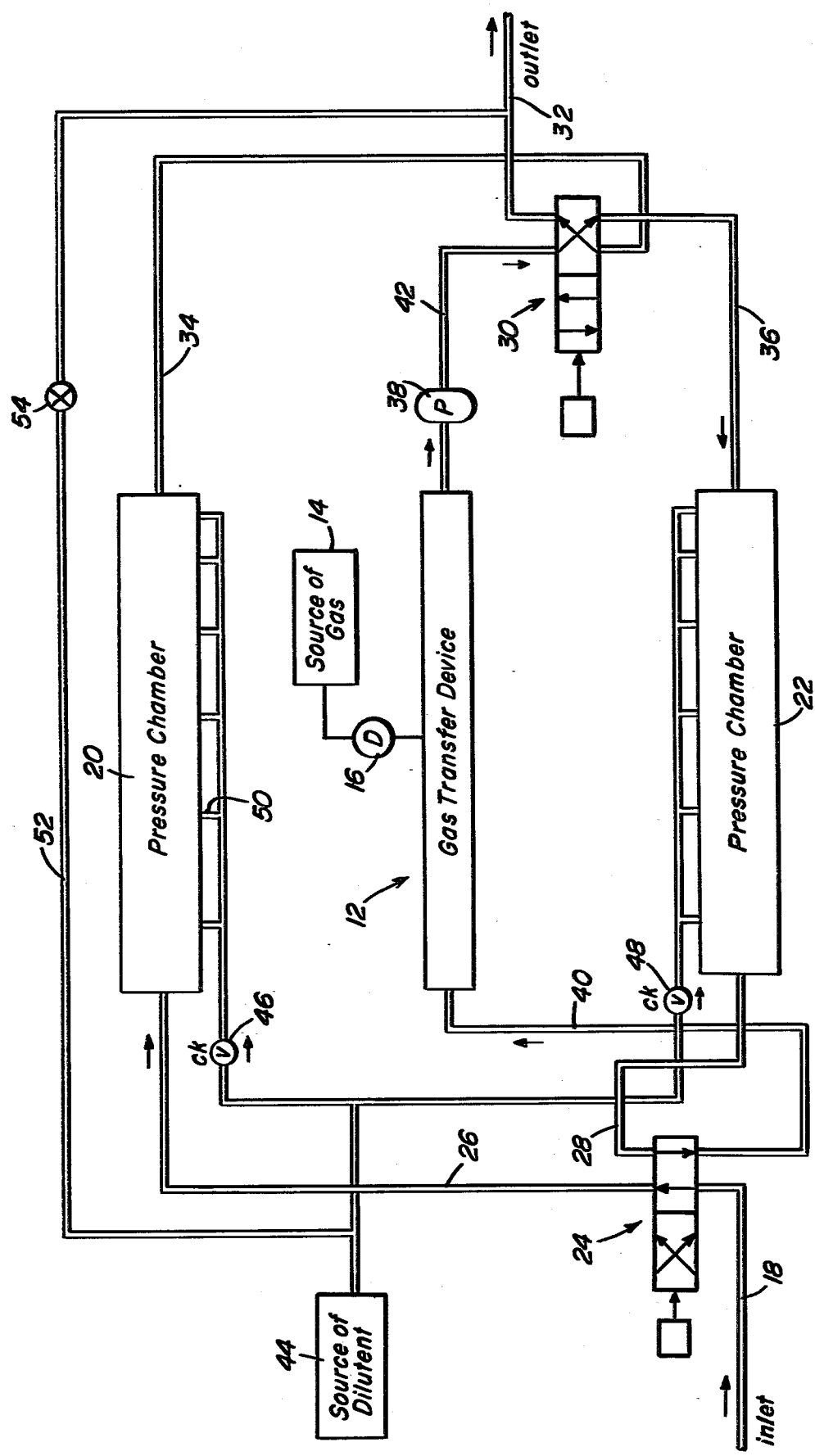

PRESSURIZED GAS TRANSFER SYSTEM WITH DILUTION CONTROL

This invention relates to the transfer of gas such as oxygen to a liquid being treated and is an improvement over the gas transfer system disclosed in my prior U.S. Pat. No. 3,926,588, the disclosure of which is incorporated herein.

An important consideration in the operation of the gas transfer system disclosed in my prior U.S. Pat. No. 3,926,588 resides in the potential loss of dissolved oxygen resulting from the turbulence created in a supersaturated effluent emerging from the plug flow chambers when depressurized. The escape of gas as bubbles from the liquid effluent because of the sudden reduction in pressure involved, is a well known phenomenon referred to as effervescence. The degree of effervescence is a function of the dissolved gas concentration, turbulence and time experienced by a supersaturated liquid expelled from the plug flow chamber at the end of a gas transfer cycle. The effervescence phenomenon limits the operating pressure differential and the amount of gas capable of being dissolved for any given dimensions for the valve passages and pressure chambers of the gas transfer device and plug flow chamber collecting zones associated with my prior patented gas transfer system. It is therefore an important object of the present invention to prevent or minimize effervescence of the gas to thereby enable operation of the gas transfer system at higher operating pressures and without dimensional enlargements.

In accordance with the present invention a liquid containing a low concentration of dissolved gas is timely introduced as a diluent to the liquid effluent of the gas transfer system after it has been highly supersaturated to prevent effervescence. In one embodiment of the invention the diluent is introduced through check valves to the plug flow chambers during displacement of the supersaturated liquid therefrom. The check valves block inflow of the diluent to one of the plug flow chambers when it is under the high pressure of the gas transfer device during recirculation of the liquid in a closed loop between the gas transfer device and said one of the plug flow chambers. The rapid dilution of the supersaturated liquid effluent as it is being expelled from the plug flow chamber under the lower inlet pressure of the incoming feed liquid has been found to prevent or minimize effervescence.

These together with other objects and advantages which will become subsequently apparent reside in the details of construction and operation as more fully hereinafter described and claimed, reference being had to the accompanying drawings forming a part hereof, wherein like numerals refers to like parts throughout.

The drawing FIGURE schematically shows the various interrelated components of the improved gas transfer system of the present invention.

Referring now to the drawing in detail, the apparatus generally denoted by reference numeral 10 for carrying out the method of the present invention is shown in schematic form. The apparatus includes any suitable gas transfer device generally referred to by reference numeral 12 such as the type disclosed in my prior U.S. Pat. No. 3,643,403 and also referred to in my prior U.S. Pat. No. 3,926,588. Gas from a source 14 is injected into the liquid circulated through the gas transfer device 12 by means of a compressor 16. The compressor 16 is continuously operated so as to maintain a constant pressure level in the gas transfer device chamber as indicated in my prior U.S. Pat. No. 3,926,588.

A raw feed liquid at some relatively low inlet pressure is conducted to the apparatus 10 by inlet conduit 18 and supplied to either plug flow chamber 20 and 22 through a two-position four-port valve 24. Supply conduits 26 and 28 respectively conduct fluid from the valve 24 to the chambers 20 and 22. A second four-port valve 30 passes the gasified fluid therein to an outlet conduit 32. Conduits 34 and 36 are alternately connected to the outlet conduit by the valve 30 to respectively conduct fluid displaced from chamber 20 or 22 to the outlet conduit. In the positions of valves 24 and 30 as shown in the drawing, liquid entering chamber 20 from the inlet conduit through conduit 26 displaces the gasified fluid therein, the fluid being conducted to the outlet through conduit 34. When both valves 24 and 30 are simultaneously shifted to their other operative position, inflowing liquid conducted by conduit 28 to chamber 22 displaces the fluid therefrom, said fluid then being conducted by conduit 36 to the outlet 32.

In either of the foregoing positions of valves 24 and 30, fluid is circulated by a pump 38 through a closed loop including the gas transfer device 12 and one of the plug flow chambers 20 and 22 constituting a collecting zone within which fluid becomes supersaturated with the gas. Toward that end, intake conduit 40 is connected between valve 24 and the inlet end of the gas transfer device while the outlet end is connected by the circulating pump 38 to valve 30 through conduit 42. Therefore, in the position of the valves shown in the drawing, the contents of chamber 22 will be gasified by its connection into the closed loop formed with the gas transfer device and pump 38 by conduits 28, 40, 42 and 36. In the other operative positions of valves 24 and 30, the closed loop including chamber 20, the gas transfer device and pump 38 is formed by conduits 26, 40, 42 and 34.

As described in my prior U.S. Pat. No. 3,926,588, the foregoing apparatus is designed to gasify a feed liquid such as water or other relatively incompressible fluent material supplied at a relatively low inlet pressure with extremely low energy requirements involved in effecting the desired transfer of gas to the liquid. The apparatus and method is useful, for example, in transferring oxygen gas to fluids undergoing waste treatment processes. It is possible by such apparatus to obtain, for example, water that is highly supersaturated with oxygen at the outlet. However, the amount of oxygen actually dissolved in the water may not be as high as possible because of effervescence. Upon depressurization of the chamber 20 or 22 within which fluid is previously supersaturated with gas by circulation through the closed loop containing the gas transfer device 12, outflow occurs to cause turbulence in the effluent conducted from the plug flow chambers to the outlet 32 through conduits 34 and 36 resulting in the loss of dissolved gas by effervescence. The degree of effervescence has been found to be a function of the concentration of dissolved gas in the supersaturated fluid and the turbulence which is related to the pressure drop and velocity of the fluid in the outlet conduits.

In accordance with the present invention, the fluid supersaturated with gas in each of the plug flow chambers 20 and 22 is rapidly diluted as it is being displaced therefrom following shift of the valves 24 and 30 when the fluid is approximately at ambient pressure. Such rapid dilution of the contents of each plug flow chamber is synchronized to follow shift of the valves 24 and 30 and thereby prevent any subsequent effervescence because of high turbulence in conduit 34 or 36. A suitable diluent, such as the infeed liquid itself having a low concentration of the dissolved gas, may be supplied from a source 44 under a suitable pressure to each of the plug flow chambers through check valves 46 and 48 and a plurality of spaced injection nozzles 50. The check valves will block inflow of diluent when the chamber 20 or 22 is under a relatively high pressure during the time it is connected to the gas transfer device in one of the closed loops that is intermittently established by shift of the valves 24 and 30. Thus, the same pressure differential between the relatively high, continuous closed loop pressure and the relatively low ambient inlet pressure which accounts for depressurization and turbulence may be utilized to control the timely inflow of diluent to each of the plug flow chambers.

With some fluids effervescence of the dissolved gas proceeds less rapidly and may be prevented or minimized by diluting the supersaturated fluid as it leaves the system. In such cases, the diluent may be supplied to the outlet conduit 32 through a by-pass line 52 connected to the source of diluent 44, upon opening of valve 54. The diluent is thereby supplied to the fluid after it leaves valve 30.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with the transfer of a relatively compressible fluid to a relatively incompressible fluent material by intermittent recirculation thereof between a transfer device and a collecting zone during which the fluent material is maintained pressurized at a relatively high level, followed by displacement of the fluent material with the compressible fluid absorbed therein from the collecting zone under a relatively low level pressure; the method of minimizing effervescence of the compressible fluid resulting from outflow of the fluent material from the collecting zone, including the steps of: supersaturating the fluent material with said compressible fluid during said recirculation; and supplying a liquid diluent to the fluent material after supersaturation thereof with the compressible fluid.

2. The method of claim 1 wherein said diluent is the fluent material with a low concentration of the compressible fluid dissolved therein as compared to a higher concentration of the compressible fluid dissolved in the supersaturated fluent material.

3. The method of claim 2 wherein said step of supplying the diluent includes introducing the diluent into the collecting zone during outflow therefrom.

4. The method of claim 3 wherein the diluent is introduced into the collecting zone only when the pressure therein is reduced below said relatively high level during said displacement of the fluent material therefrom under the relatively low level pressure.

5. The method of claim 1 wherein said step of supplying the diluent includes introducing the diluent into the collecting zone during outflow therefrom.

6. The method of claim 5 wherein the diluent is introduced into the collecting zone only when the pressure therein is reduced below said relatively high level during said displacement of the fluent material therefrom under the relatively low level pressure.

7. In a method of transferring a relatively compressible fluid to a relatively incompressible fluent material, the steps of: inducing a continuous flow of the fluent material through a transfer device under a relatively high pressure; directing said flow for recirculation of the fluent material through a closed loop between the transfer device and a collecting zone within which the concentration of the compressible fluid within the fluent material increases; intermittently displacing the fluent material from the collecting zone under a relatively low pressure when the concentration of the compressible fluid therein has increased to a predetermined value, and rapidly diluting the concentration of the compressible fluid in the fluent material at said predetermined value with a liquid diluent to prevent effervescence in response to displacement of the fluent material from the collecting zone by a reduction in pressure thereof from said relatively high pressure.

8. The method of claim 7 wherein said step of diluting includes: introducing said diluent to the collecting zone during said displacement of the fluent material.

* * * * *